(12) United States Patent
Heinzel et al.

(10) Patent No.: US 9,790,433 B2
(45) Date of Patent: Oct. 17, 2017

(54) PROCESS FOR PRODUCING SYNTHESIS GAS

(71) Applicants: Albrecht Heinzel, Munich (DE); Rachid Mabrouk, Munich (DE)

(72) Inventors: Albrecht Heinzel, Munich (DE); Rachid Mabrouk, Munich (DE)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 15/443,467

(22) Filed: Feb. 27, 2017

(65) Prior Publication Data

US 2017/0260457 A1   Sep. 14, 2017

(30) Foreign Application Priority Data

Mar. 8, 2016  (DE) .................. 10 2016 002 728

(51) Int. Cl.
| | | |
|---|---|---|
| *C10G 2/00* | (2006.01) | |
| *C01B 3/36* | (2006.01) | |
| *C10G 45/02* | (2006.01) | |
| *C01B 3/48* | (2006.01) | |

(52) U.S. Cl.
CPC .................. *C10G 2/30* (2013.01); *C01B 3/36* (2013.01); *C01B 3/48* (2013.01); *C10G 45/02* (2013.01); *C01B 2203/0211* (2013.01); *C01B 2203/0255* (2013.01); *C01B 2203/0283* (2013.01); *C01B 2203/062* (2013.01); *C10G 2300/202* (2013.01); *C10G 2300/42* (2013.01)

(58) Field of Classification Search
CPC .... C10G 2/30; C10G 45/02; C10G 2300/202; C10G 2300/42; C01B 3/48; C01B 3/36; C01B 2203/062; C01B 2203/0211; C01B 2203/0255; C01B 2203/0283
See application file for complete search history.

(56) References Cited

U.S. PATENT DOCUMENTS

| | | | | |
|---|---|---|---|---|
| 2002/0115731 A1* | 8/2002 | Price | .................. | C10G 2/32 518/703 |
| 2006/0135629 A1* | 6/2006 | Abbott | .................... | C01B 3/382 518/702 |
| 2008/0312347 A1* | 12/2008 | Ernst | ....................... | C01B 3/36 518/702 |
| 2014/0135409 A1* | 5/2014 | Aasberg-Petersen | ..... | C01B 3/38 518/703 |
| 2014/0326639 A1* | 11/2014 | Hoek | .................... | C10G 45/02 208/15 |

FOREIGN PATENT DOCUMENTS

WO   WO2006/117499 A1   11/2006

* cited by examiner

*Primary Examiner* — Jafar Parsa
(74) *Attorney, Agent, or Firm* — Philip H. Von Neida

(57) ABSTRACT

A process for producing hydrocarbons is disclosed in which a first feed substream and a second feed substream are obtained from a hydrocarbonaceous feed stream, of which the first feed substream is converted by means of partial oxidation or autothermal reforming to a first synthesis gas stream and the second feed substream is converted by means of steam reforming to a second synthesis gas stream and subsequently combined with the first synthesis gas stream to give a third synthesis gas stream, of which at least a first portion is converted by Fischer-Tropsch synthesis to a crude product stream comprising hydrocarbons of different chain lengths, from which light hydrocarbons are separated in a tail gas, in order to recycle them and use them in the partial oxidation or autothermal reforming. The characteristic feature here is that unsaturated hydrocarbons are separated from at least a portion of the tail gas.

9 Claims, 1 Drawing Sheet

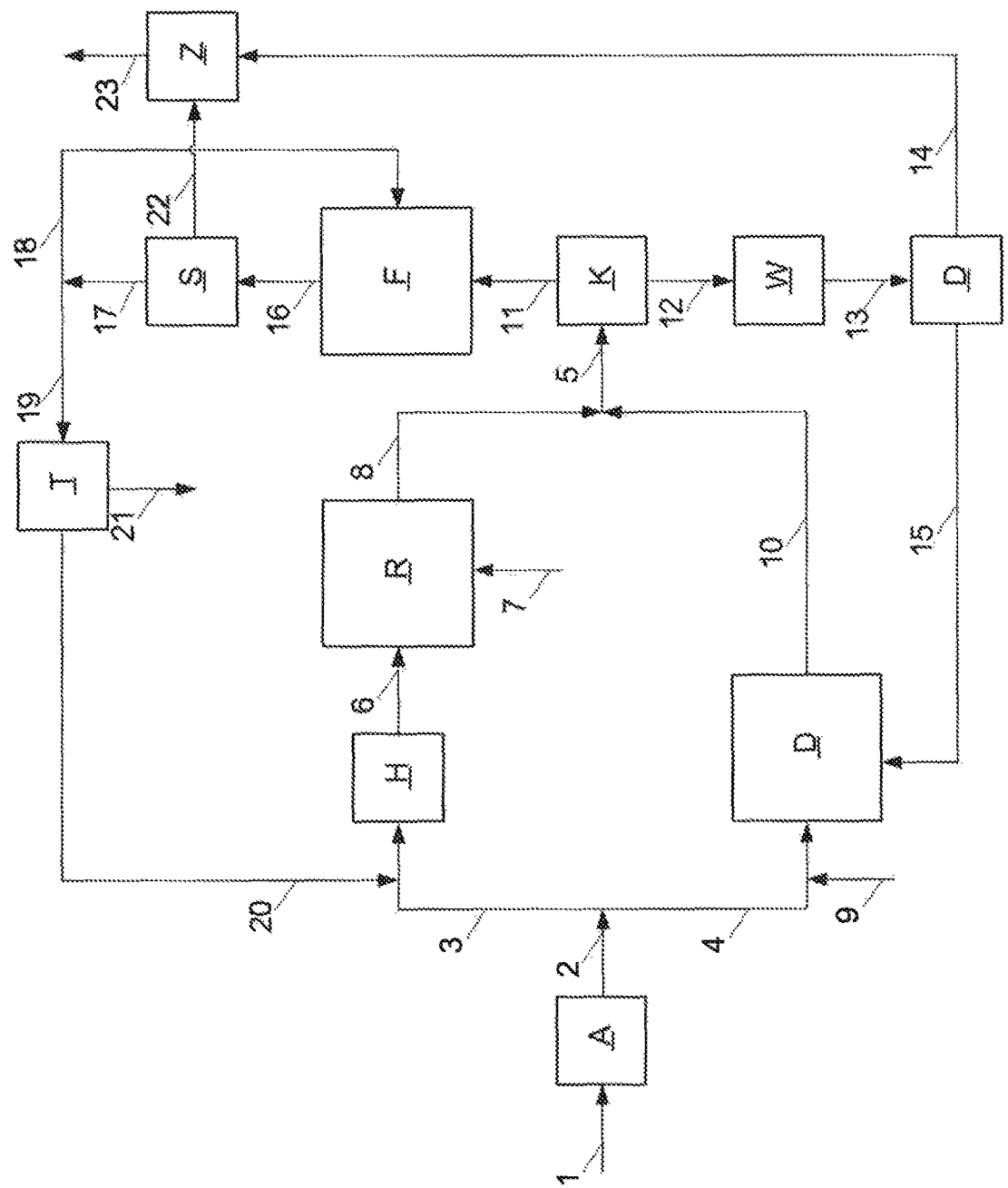

PROCESS FOR PRODUCING SYNTHESIS GAS

CROSS REFERENCE TO RELATED APPLICATIONS

This application claims priority from German Patent Application DE 102016002728.2 filed on Mar. 8, 2016

BACKGROUND OF THE INVENTION

The invention relates to a process for producing hydrocarbons, in which a first feed substream and a second feed substream are obtained from a hydrocarbonaceous feed stream, of which the first feed substream is converted by means of partial oxidation or autothermal reforming to a first synthesis gas stream and the second feed substream is converted by means of steam reforming to a second synthesis gas stream and subsequently combined with the first synthesis gas stream to give a third synthesis gas stream, of which at least a first portion is converted by Fischer-Tropsch synthesis to a crude product stream comprising hydrocarbons of different chain lengths, from which light hydrocarbons are separated in a tail gas, in order to recycle them and use them in the partial oxidation or autothermal reforming.

A process of this kind is known, for example, from WO2006/117499A1. Through the parallel connection of partial oxidation (PDX) or autothermal reforming (ATR) and steam reforming, it is advantageously possible to combine the strengths of the processes used, by means of which the ratio of hydrogen to carbon monoxide in the synthesis gas can be established in a comparatively simple and inexpensive manner within a wide range of values and in accordance with the requirements of the Fischer-Tropsch synthesis. At the same time, the efficiency of the synthesis gas production is distinctly increased compared to the individual processes. Furthermore, the use of the hydrocarbons present in the tail gas in PDX or ATR contributes to a high yield of the process.

The Fischer-Tropsch synthesis typically affords a crude product stream which especially includes synthetic oil, called "synthetic crude", light hydrocarbons having four or fewer carbon atoms, heavy hydrocarbons having five or more (preferably up to 60) carbon atoms, and unconverted synthesis gas. Typically, the tail gas is separated from the crude product stream in a cold trap and comprises, as well as saturated and unsaturated light hydrocarbons, also oxygenates and unconverted synthesis gas.

The first feed substream, after preheating with cooling process streams, is mixed with the recycled tail gas, introduced into the PDX or ATR reactor and reacted in an exothermic process with oxygen which is supplied to the reactor with technical grade purity and in a substoichiometric amount.

The recycling of the tail gas limits the maximum possible preheating temperature of the feedstocks for PDX or ATR to temperatures at which the unsaturated hydrocarbons do not yet break down and lead to soot deposits in conduits and the reactor. In order nevertheless to be able to attain the temperatures needed for the conversion of the feedstocks, an elevated amount of oxygen has to be provided, which considerably impairs the economic viability of the process.

SUMMARY OF THE INVENTION

Against this background, the problem addressed by the invention is that of providing a process of the type specified at the outset, which is improved with regard to the problems mentioned.

The stated problem is solved in accordance with the invention by separating unsaturated hydrocarbons from at least a portion of the tail gas in order to obtain a stream substantially free of unsaturated hydrocarbons as feed for the partial oxidation or autothermal reforming.

For removal of the unsaturated hydrocarbons, cryogenic separation methods are appropriately employed, as known for such purposes from the prior art.

Preferably, the stream which is substantially free of unsaturated hydrocarbons and is obtained from the tail gas of the Fischer-Tropsch synthesis is preheated together with or independently of the first feed substream and fed to the PDX or ATR. Because of the substantial absence of unsaturated hydrocarbons, the preheating can be effected up to significantly higher temperatures than in the prior art without any risk of formation of soot deposits, which makes it possible to conduct PDX or ATR with a distinctly smaller amount of oxygen. Preferably, the stream which is substantially free of unsaturated hydrocarbons is preheated to temperatures up to 450° C. when it is fed to a PDX reactor. If it is fed to an ATR reactor, preheating is even possible to temperatures of up to 600° C., since the steam used here suppresses breakdown processes.

In one configuration of the invention, the unsaturated hydrocarbons are removed only from a portion of the tail gas and the remainder is recycled as feed into the Fischer-Tropsch synthesis and/or used as fuel.

The unsaturated hydrocarbons separated from the tail gas, which are predominantly those having 2 or 3 carbon atoms, can be discarded. However, it is sensible to use them for underfiring within the process according to the invention, or to release them for a credit as a product for physical or thermal utilization.

Preferably, the feed stream, which is natural gas, for example, or the two feed substreams are desulphurized, desuiphurization in the context of the present invention meaning that sulphur and/or at least one sulphur compound (preferably several or all sulphur compounds) in the stream in question are reduced to a content below a predefined value, especially below 10 ppm, preferably below 1 ppm. Appropriately, the desulphurization is effected using hydrogen (for example by means of hydrodesuiphurization), this hydrogen being obtained, for example, from a portion of the synthesis gas stream and/or from the tail gas separated from the crude product stream of the Fischer-Tropsch synthesis.

In one embodiment of the invention, it is additionally envisaged that the feed stream will be conducted through an adsorber unit before being divided into the two feed substreams, especially with adsorption of one or more sulphur compounds in the feed stream and removal from the feed stream. The compounds removed are, for example, $H_2S$, $CS_2$, COS and/or HCN. The possibility of correspondingly treating each of the two feed substreams instead of the feed stream in a dedicated adsorber unit is additionally not to be ruled out.

As a result of the different production methods, the first synthesis gas stream obtained by PDX or ATR usually has a different composition from the second synthesis gas stream produced by steam reforming, and so it is possible to influence the ratio of hydrogen to carbon monoxide in the third synthesis gas stream obtained by combining the two streams by altering the ratios of the volume flow rates. For this purpose, for example, the division of the feed stream into the two feed substreams can be made under closed-loop control, in order to adjust the ratio of hydrogen to carbon monoxide in the synthesis gas to a given value. Alternatively or additionally, it is also possible to alter the ratio of the volume flow rates of the first and second synthesis gases before they are combined to give the third synthesis gas stream by branching off one or more substreams under closed-loop control.

Preferably, said ratio of hydrogen to carbon monoxide in the third synthesis gas stream is adjusted to a value in the range from 1.5 to 2.5.

It is additionally envisaged, in one embodiment of the invention, that the first and second synthesis gas streams and/or the third synthesis gas stream formed from said two streams will be cooled with water, in which case steam formed is especially used to generate electrical energy. Appropriately, the steam is superheated in the waste heat system of the reactor used for steam reforming of the second feed substream before being expanded to perform work in a steam turbine coupled to an electrical generator.

In a further embodiment of the invention, it is envisaged that the third synthesis gas stream will be divided into a first synthesis gas substream and a second synthesis gas substream, and the first synthesis gas substream will be used as feed in the Fischer-Tropsch synthesis and the second synthesis gas substream will be subjected to a water-gas shift reaction in which carbon monoxide present in the second synthesis gas substream reacts with water to give hydrogen and carbon dioxide, such that the carbon monoxide content in the second synthesis gas substream is reduced and the hydrogen content is simultaneously increased.

Preferably, the second synthesis gas substream, after the water-gas shift reaction, is subjected to a pressure swing adsorption, wherein carbon dioxide present in the shifted synthesis gas substream, and also methane and water, are adsorbed in an adsorber at a first pressure, and a hydrogenous stream is produced, which passes through the adsorber and has a hydrogen content in the range from 98.0% to 99.9% by volume. The laden adsorber is regenerated at a second pressure lower than the first pressure, by purging it with a hydrogenous purge gas stream in order to desorb adsorbed carbon dioxide and further adsorbed substances (e.g. methane and water) and remove them from the adsorber. The laden purge gas stream is subsequently preferably used as fuel, in order, for example, to provide heat for the steam reforming of the second feed substream.

In a further embodiment of the invention, oxygen is separated from air (for example in a cryogenic air fractionation plant) and used as oxidizing agent in the partial oxidation. Preferably, pure oxygen having an oxygen content of at least 95% by volume is used as oxidizing agent.

It is additionally envisaged that hydrogen from the hydrogenous stream obtained by pressure swing adsorption from the shifted portion of the third synthesis gas stream will be used for hydrogenation of heavy hydrocarbons of the portion of the crude product stream that remains after the tail gas removal. The crude product stream treated in this way is subsequently released directly as hydrocarbonaceous product stream or divided into a number of fractions comprising hydrocarbons of different lengths, which are then conducted onward as hydrocarbonaceous product streams. Alternatively or additionally, the hydrogen can be used for desulphurization of the feed stream or of one or both feed substreams.

BRIEF DESCRIPTION OF THE DRAWINGS

The invention is to be elucidated in detail hereinafter with reference to a working example shown schematically in the FIGURE.

The FIGURE shows a preferred configuration of the process according to the invention

DETAILED DESCRIPTION OF THE INVENTION

The feed stream 1, which is natural gas, for example, is guided through an adsorber unit A for desulphurization, in order to remove sulphur compounds present and hydrogen cyanide down to contents below 1 ppm. Subsequently, the desulphurized feed stream 2 is divided into two feed substreams 3 and 4, it being possible to individually adjust the respective volume flow rates of these substreams, in order more particularly to set the ratio of hydrogen to carbon monoxide in the third synthesis gas stream 5 (see below).

The first feed substream 3 is combined with the stream 20, consisting predominantly of saturated hydrocarbons and carbon monoxide, carbon dioxide and hydrogen, and preheated together therewith in the preheater unit H, before both streams are introduced into the reactor R as feed stream 6 and reacted with an oxidizing agent 7 to give a first synthesis gas stream 8. If the reactor R is a PDX reactor, the preheating can be effected up to temperatures of 450° C., while 600° C. is even possible when the reactor R is an ATR reactor. The oxidizing agent 7 used is preferably oxygen of technical grade purity, which is obtained, for example, by cryogenic air fractionation. The oxygen can also be obtained in another way, for instance in a membrane method or by pressure swing adsorption.

The second feed substream 4 is subjected to steam reforming D, for which it is mixed with steam and/or carbon dioxide 9 and converted to a second synthesis gas stream 10 in the reactor tubes of the steam reformer D, in which a suitable catalyst is disposed, at a temperature between 700° C. and 950° C. and a pressure in the range from 15 bar to 45 bar.

The two synthesis gas streams 8 and 10, which, as a result of the production methods, have a different ratio of hydrogen to carbon monoxide, are then combined to give the third synthesis gas stream 5 having a hydrogen/carbon monoxide ratio in the range from 1.5 to 2.5.

The third synthesis gas stream 5, after being cooled and dried in the cooling unit K, is divided into a first synthesis gas substream 11 and a second synthesis gas substream 12, the volume flow rates of which have a ratio in the range from 0.01 to 0.05. While the first synthesis gas substream 11 is fed as a feed to a Fischer-Tropsch synthesis F, the second synthesis gas substream 12 is subjected to a water-gas shift reaction W in which carbon monoxide present is reacted with water to give hydrogen and carbon dioxide, so as to obtain a synthesis gas substream 13 with an elevated carbon monoxide content and reduced hydrogen content. The synthesis gas substream obtained in the water-gas shift is subsequently subjected to a known pressure swing adsorption D in order to obtain a hydrogen-rich stream 14 and a purge gas stream 15 laden with removed gas components, which subsequently serves as fuel and is used, for example, to supply heat to the steam reformer D.

In the Fischer-Tropsch synthesis F, the first synthesis gas substream 11 is converted to a crude product stream 16 comprising light hydrocarbons having four or fewer carbon atoms, heavy hydrocarbons having five or more carbon atoms, and unconverted synthesis gas. A tail gas 17 is separated from the crude product stream 16 in the cold trap S and consists in particular of unconverted synthesis gas and saturated and unsaturated light hydrocarbons. A first portion 18 of the tail gas 17 is recycled as feed into the Fischer- Tropsch synthesis, while a second portion 19 is sent to a removal unit T in which a stream 20 predominantly free of unsaturated hydrocarbons and a stream 21 largely consisting of unsaturated hydrocarbons are obtained. The stream 20 predominantly free of unsaturated hydrocarbons is then combined with the first feed substream 3, while the stream 21 largely consisting of unsaturated hydrocarbons can be released, for example, as a product.

The hydrogen-rich stream 14 produced in the pressure swing adsorption D is used in the hydrogenation reactor Z for hydrogenation of heavy or unsaturated hydrocarbons in the crude product stream 22 which remains after removal of the tail gas 17 and is converted in the process to the hydrocarbonaceous product stream 23.

What we claim is:

1. A process for producing hydrocarbons, in which a first feed substream and a second feed substream are obtained from a hydrocarbonaceous feed stream, of which the first feed substream is converted by means of partial oxidation or autothermal reforming to a first synthesis gas stream and the second feed substream is converted by means of steam reforming to a second synthesis gas stream and subsequently combined with the first synthesis gas stream to give a third synthesis gas stream, of which at least a first portion of the third synthesis gas stream is converted by Fischer-Tropsch synthesis to a crude product stream comprising hydrocarbons of different chain lengths, from which light hydrocarbons are separated in a tail gas, in order to recycle them and use them in the partial oxidation or autothermal reforming, characterized in that unsaturated hydrocarbons are separated from at least a portion of the tail gas by a cryogenic separation method in order to obtain a stream which is substantially free of unsaturated hydrocarbons as a feed for the partial oxidation or autothermal reforming.

2. The process according to claim 1, characterized in that the unsaturated hydrocarbons separated from the at least one portion of the tail gas are used for underfiring within the process or are released for a credit as a product for physical or thermal utilization.

3. The process according to claim 1, characterized in that the ratio of the volume flow rates of the first feed substream and the second feed substream is set in order to set the ratio of hydrogen and carbon monoxide in the third synthesis gas stream.

4. The process according to claim 1, characterized in that the ratio of the volume flow rates of the first synthesis gas and the second synthesis gas before the first synthesis gas and the second synthesis gas are combined to give the third synthesis gas stream is altered by branching off one or more substreams under closed-loop control, in order to set the ratio of hydrogen and carbon monoxide in the third synthesis gas stream.

5. The process according to claim 3, characterized in that the ratio of hydrogen to carbon monoxide in the third synthesis gas stream is set to a value in the range from 1.5 to 2.5.

6. The process according to claim 1, characterized in that the third synthesis gas stream is cooled in a cooling unit with water to raise steam which is subsequently used to generate electrical energy, and the steam, after superheating in the waste heat system of the steam reformer, is expanded in a steam turbine coupled to an electrical generator.

7. The process according to claim 1, characterized in that the third synthesis gas stream is divided into a first synthesis gas substream and a second synthesis gas substream, and the first synthesis gas substream is used as feed for the Fischer-Tropsch synthesis, while the second synthesis gas substream is subjected to a water-gas shift reaction in order to reduce the CO content in the second synthesis gas substream and to increase the hydrogen content.

8. The process according to claim 7, characterized in that the second synthesis gas substream, after the water-gas shift reaction, is subjected to a pressure swing adsorption to obtain a hydrogen-rich stream and a purge gas stream laden with removed gas components.

9. The process according to claim 8, characterized in that the hydrogen-rich stream is used for hydrogenation of heavy hydrocarbons obtained in the Fischer-Tropsch synthesis and/or for desulphurization of the feed stream or one or both feed substreams.

* * * * *